US009804730B2

(12) United States Patent
Lefor

(10) Patent No.: US 9,804,730 B2
(45) Date of Patent: Oct. 31, 2017

(54) AUTOMATICALLY CHANGING A DISPLAY OF GRAPHICAL USER INTERFACE

(71) Applicant: Microsoft Corporation, Redmond, WA (US)

(72) Inventor: Todd Lefor, Fargo, ND (US)

(73) Assignee: Microsoft Technology Licensing, LLC, Redmond, WA (US)

(*) Notice: Subject to any disclaimer, the term of this patent is extended or adjusted under 35 U.S.C. 154(b) by 303 days.

(21) Appl. No.: 13/908,717

(22) Filed: Jun. 3, 2013

(65) Prior Publication Data
US 2014/0359472 A1 Dec. 4, 2014

(51) Int. Cl.
G06F 3/0481 (2013.01)
H04M 1/725 (2006.01)

(52) U.S. Cl.
CPC ...... *G06F 3/0481* (2013.01); *H04M 1/72569* (2013.01)

(58) Field of Classification Search
CPC ........ G06F 9/4443; G06F 3/0481; G06F 8/38; H04M 1/72569
USPC ........................................................ 715/746
See application file for complete search history.

(56) References Cited

U.S. PATENT DOCUMENTS

| 6,262,730 B1 | 7/2001 | Horvitz et al. |
| 2004/0259598 A1* | 12/2004 | Wagner ............... G06F 3/04817 455/566 |
| 2006/0206698 A1 | 9/2006 | Foucher et al. |
| 2006/0276174 A1* | 12/2006 | Katz ................. G06F 17/30864 455/410 |
| 2007/0088580 A1* | 4/2007 | Richards, Jr. ..................... 705/4 |
| 2009/0228698 A1* | 9/2009 | Shirlen et al. ................. 713/150 |
| 2009/0319462 A1* | 12/2009 | Tirpak et al. ................... 706/47 |
| 2010/0100204 A1* | 4/2010 | Ng et al. ......................... 700/91 |
| 2010/0218171 A1 | 8/2010 | Munson et al. |

(Continued)

FOREIGN PATENT DOCUMENTS

| EP | 1 465 392 A2 | 6/2004 |
| EP | 2 523 436 A1 | 11/2012 |
| WO | 2013/006654 A2 | 1/2013 |

OTHER PUBLICATIONS

Moura, et al., "Visualizing and Understanding Players' Behavior in Video Games: Discovering Patterns and Supporting Aggregation and Comparison", In Proceedings of the ACM SIGGRAPH Symposium on Video Games, Aug. 10, 2011, 6 pages.

(Continued)

*Primary Examiner* — Alvin Tan
(74) *Attorney, Agent, or Firm* — Merchant & Gould P.C.

(57) ABSTRACT

Usage information is used to automatically change a display of a Graphical User Interface (GUI) for a computer application. Recommendations may also be automatically provided that when accepted by a user change the GUI of the application. The usage information includes recorded interactions along with the context of the actions. Generally, the contextual usage information includes interaction information that may be used to determine how a user is interacting with the application based on the current context of the user. The usage information that is recorded from one or more users may be used to change the GUI and/or provide recommendations. Usage information obtained from a larger set of users (e.g. based on a type of business) may be used to automatically determine the recommendations or change the GUI.

19 Claims, 12 Drawing Sheets

(56) References Cited

U.S. PATENT DOCUMENTS

| | | |
|---|---|---|
| 2011/0028138 A1 | 2/2011 | Davies-Moore et al. |
| 2012/0245715 A1 | 9/2012 | Short |
| 2013/0014040 A1* | 1/2013 | Jagannathan ......... G06Q 50/01 |
| | | 715/765 |
| 2013/0024203 A1 | 1/2013 | Flores et al. |
| 2013/0074051 A1 | 3/2013 | Freeman |
| 2014/0105447 A1* | 4/2014 | Samari ............. G06F 17/30743 |
| | | 382/100 |

OTHER PUBLICATIONS

Johnson, et al., "Improving Software Development Management through Software Project Telemetry", In IEEE Software, vol. 22, Issue 4, Jul. 2005, 10 pages.

International Search Report and Written Opinion for PCT/US2014/040153 mailed Aug. 28, 2014.

"International Preliminary Report on Patentability Issued in PCT Application No. PCT/US2014/040153", Mailed Date: Aug. 14, 2015, 7 Pages.

\* cited by examiner

Take Payment Discounts — 400

Summary (410)
Take payment discounts when you pay invoices. You only take 21% of the payment discounts available. Other US companies of the same size and growth rate take over 75%.

Actions (420)
Show Column
A majority of users in your role sort the list of "Invoices to pay" by the column "Discount expiration date." You do not show this column. Add the column and sort earliest date first

Accept

Rationale (430)
Your industry has a high degree of competition on sale processes which makes it difficult to increase profits through higher prices.

Taking full advantage of payment discounts on vendor invoices means that you effectively reduce your average purchase price and increase your profitability.

Statistics (440)

Graph (442) of Payment Discounts taken over a Period of Time (Average 21%)

Cross-Company Comparison Graph (444) (Industry Statistics)

FIG. 4

Mobile Computing Device

AUTOMATICALLY CHANGING A DISPLAY OF GRAPHICAL USER INTERFACE

BACKGROUND

Many computer applications are initially developed and updated with usability in mind. Throughout an application lifecycle, usability tests may be performed to see how users interact with the application. Users may also share concerns about the use and functionality of the application. Results from these usability tests are then used to improve the usability of the application. For example, the design of the Graphical User Interface (GUI) may be changed in response to results from the usability tests.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Usage information is used to automatically change a display of a Graphical User Interface (GUI) for a computer application. Recommendations may also be automatically provided that when accepted by a user changes the display of the GUI. The usage information includes authorized recorded interactions along with the context of the actions. For example, in addition to recording a user selection of a GUI element in the application, contextual information associated with the selection is also recorded. The contextual information that is recorded may include a variety of different information. For example, a user's current environment (e.g. platform, device, locale, . . . ), a current form receiving the interaction, and the like may be recorded with the user interaction. Generally, the contextual usage information includes interaction information that may be used to determine how a user is interacting with the application instead of recording just what was selected. The usage information that is associated with one or more users may be used to change the GUI and/or provide recommendations. For example, the GUI may be automatically changed using a single user's usage information or changed using a designated group of users' usage information (e.g. users having a similar job description). Usage information obtained from a larger set of users (e.g. based on a type of business) may be used to automatically determine the recommendations or change the GUI. For example, it may be determined that a user in one business is not taking advantage of a certain feature in the application that is used by similarly situated companies.

BRIEF DESCRIPTION OF THE DRAWINGS

FIG. 4 shows an example recommendation and actions to change a display of the Graphical User Interface for an application;

DETAILED DESCRIPTION

Figure 1:
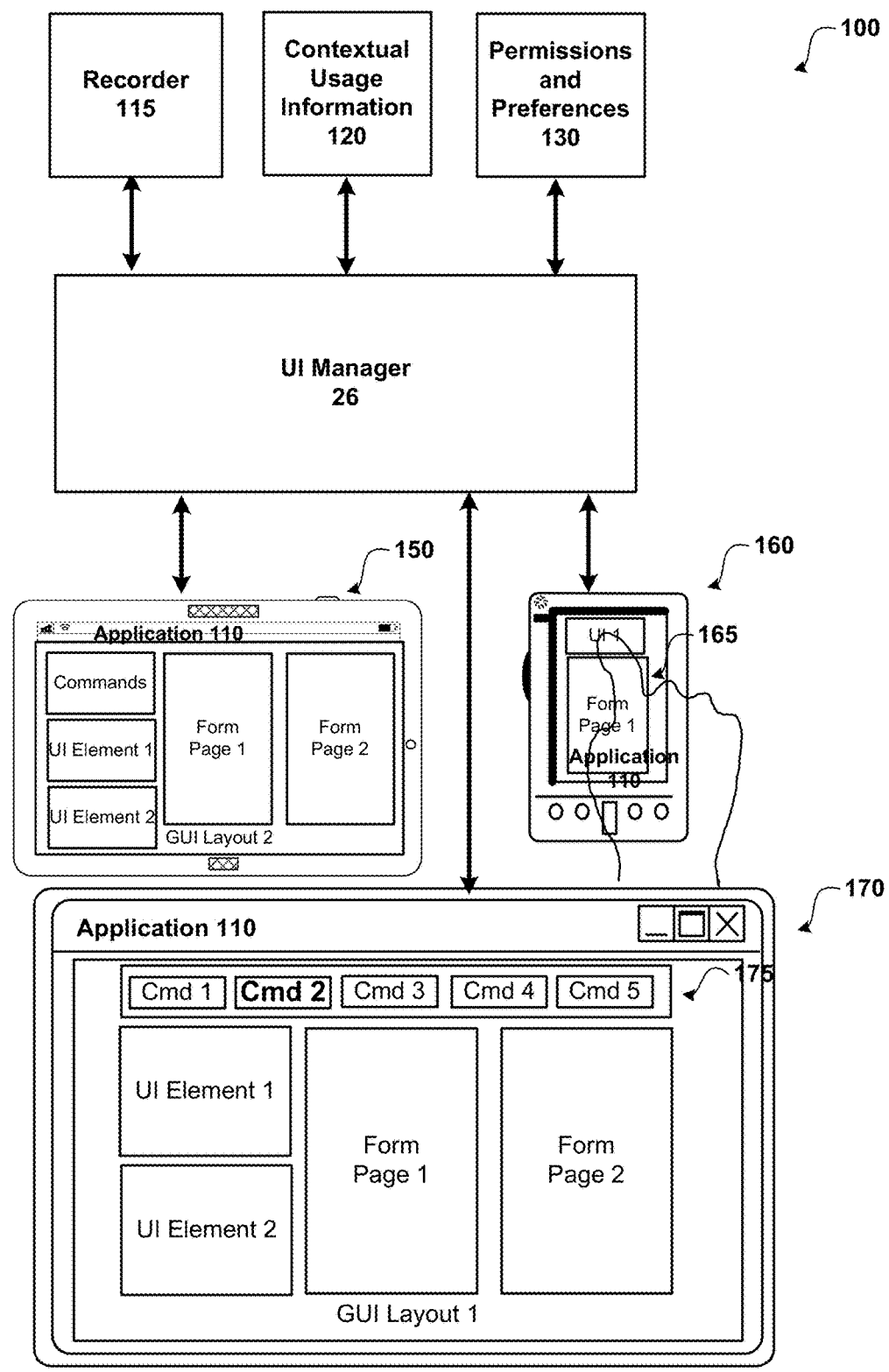
FIG. 1 shows a system that automatically changes a GUI display for an application based on usage information.

Referring now to the drawings, in which like numerals represent like elements, various embodiment will be described elements, various embodiment will be described.

FIG. 1 shows a system that automatically changes a GUI display for an application based on usage information.

As illustrated, system 100 includes application 110, recorder 115, contextual usage information 120, permissions and preferences 130, UI manager 26, tablet computing device 150, smart phone device 160, and computing device 170. UI manager 26 is configured to automatically change a display of a Graphical User Interface (GUI) for a computer application using usage information. UI manager 26 may also generate and display recommendations that when accepted by a user change the display of the GUI for an application.

According to an embodiment, contextual usage information 120 includes recorded interactions along with the context of the interactions made by a user when interacting with an application. For example, in addition to recording a user selection of a GUI element in the application, contextual information associated with the selection is also recorded by UI manager 26.

Recorder 115 may be used by UI manager 26 to record the user interactions and their context and to store the recorded usage information in contextual usage information 120. The contextual usage information that is recorded by recorder 115 may include a variety of different contextual usage information. For example, contextual usage information 120 may include a user's current environment (e.g. platform, device, locale, . . . ), a current form receiving the interaction, a current session for interacting with the application, and the like may be recorded with each of the received user interactions. Generally, contextual usage information 120 includes interaction information that may be used to determine how a user is interacting with the application instead of recording just what was selected by a user. Contextual usage information 120 may store contextual usage information for one or more users.

A user may configure different criteria, such as permissions and preferences 130 that are related to the collection of contextual usage information and the use of the contextual usage information. The user may set permissions that specify what information is allowed to be collected that relates to the user. For example, a user may select options to opt-in to allow different types of information to be collected before any usage information is collected. A user may decide to allow some types of information to be collected and decide to not allow other types of information to be collected. Access to the collected contextual usage information 120 is limited to an authorized user who has provided the correct security credentials. The collected contextual usage information is stored securely until it is deleted.

UI manager 26 determines usage patterns using the stored contextual usage information to determine how to change the display of the GUI for a user or a group of similarly situated users (e.g. same work group, same company, . . . ). For example, the contextual usage information previously collected for a user may indicate that when the user is using their tablet device 150 to run application 110 they do not use commands 175 that are shown in GUI Layout 1. As such, UI manager 26 automatically changes the display of the GUI to more prominently show other features of the application that are used when using a tablet device. In this example, commands 175 are placed into a different UI element as shown on tablet device 150 by UI manager 26 such that more space is available to display the form pages. The display of the GUI may change in other ways. For example, UI elements may be: removed from the display; added to the display; moved on the display; change forms; highlighted or emphasized, and the like.

Smart phone 160 shows the display of the GUI layout changed in response to the collected usage information for the user using application 110 on their smartphone. As illustrated, many elements of the GUI have been removed from the display as compared to the GUI Layout 1 shown on computing device 170. Further, instead of showing two form pages, one form page is shown on smart phone 160 in response to UI manager 26 determining that the user generally shows one page while using smart phone 160.

Computing device 170 shows another display of the GUI for application 110 that is displayed according to the collected contextual usage information that is associated with a user. In the current example, "Cmd 2" is highlighted by UI manager 26 to provide an indication to a user to select the option. For example, contextual usage information 120 may indicate that a user is not selecting Cmd 2 after performing another task. There are many other examples of automatically changing the display of the GUI using contextual usage information. As can be seen in FIG. 1, instead of just changing the display in response to a number of selections of a UI element, the display of the GUI for an application is changed using contextual information related to the selection. More details are provided in the following description and associated figures.

In order to facilitate communication with UI manager 26, one or more callback routines, may be implemented. Application 110 may be a variety of applications, such as business productivity applications, entertainment applications, music applications, travel applications, video applications, and the like. Generally, application 110 may be any application that uses a GUI. The application 110 may be configured to receive different types of input (e.g. speech input, touch input, keyboard input (e.g. a physical keyboard and/or Software Input Panel (SIP)) and/or other types of input.

System 100 as illustrated comprises one or more touch screen input devices, such as tablet computing device 150 and smart phone device 160, that detects when a touch input has been received (e.g. a finger touching or nearly touching the touch screen). Any type of touch screen may be utilized that detects a user's touch input. More details are provided below.

Figure 2:
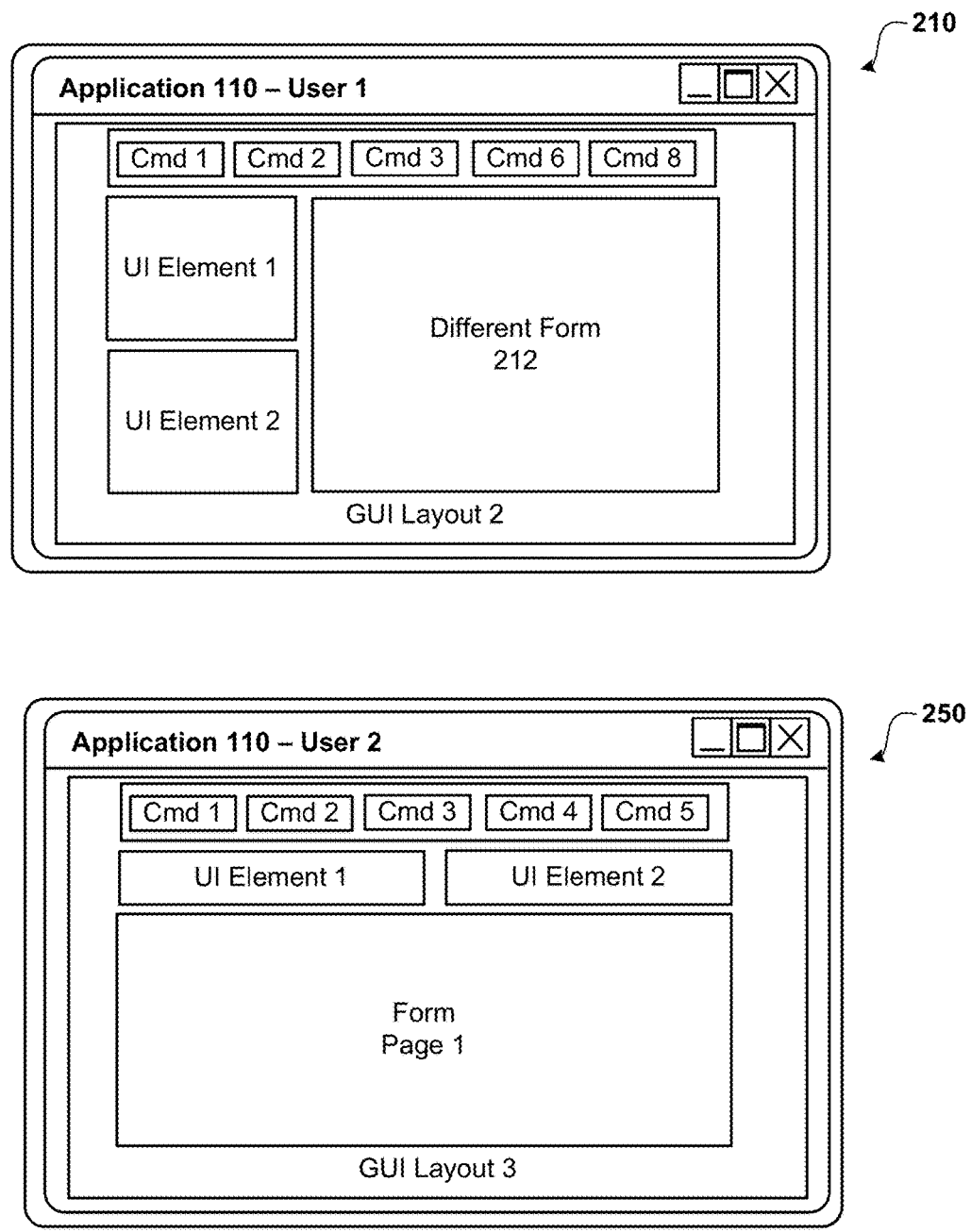
FIG. 2 shows an example of automatically changing the display of the GUI based on contextual usage information associated with different users.

FIG. 2 shows an example of automatically changing the display of the GUI based on contextual usage information associated with different users.

The examples provided herein are for illustration purposes and are not intended to be limiting.

Display 210 shows a tablet computing device that shows a display of GUI elements for application 110 while being used by User 1. Display 250 shows a tablet computing device that shows a display of GUI elements for application 110 while being used by User 2. As can be seen, the layouts of the GUI are different for each user. GUI Layout 2 shown in display 210 shows a different form 212 than GUI layout 1 illustrated in FIG. 1. GUI layout 2 shown in display 210 also displays different commands than shown in GUI layout 1. GUI Layout 3 shown in display 250 shows the same form as illustrated the GUI layout 1 shown in FIG. 1, but instead of showing two forms, one form is illustrated on display 250. The contextual usage information associated with a user is used to automatically adjust the GUI.

The usage information that is associated with one or more users may be used to change the GUI and/or provide recommendations. For example, the GUI may be automatically changed using a single user's usage information or changed using a designated group of users' usage information (e.g. users having a similar job description). The display of the GUI may be changed based on many different types of contextual usage information. For example, the GUI may be changed based on a variety of different information, including, but not limited to: a type of device being used, a locale where the application is used, a language of the application, a role of the user, and the like. See below for exemplary contextual usage information that may be used to automatically change the display and provide recommendations.

Figure 3:
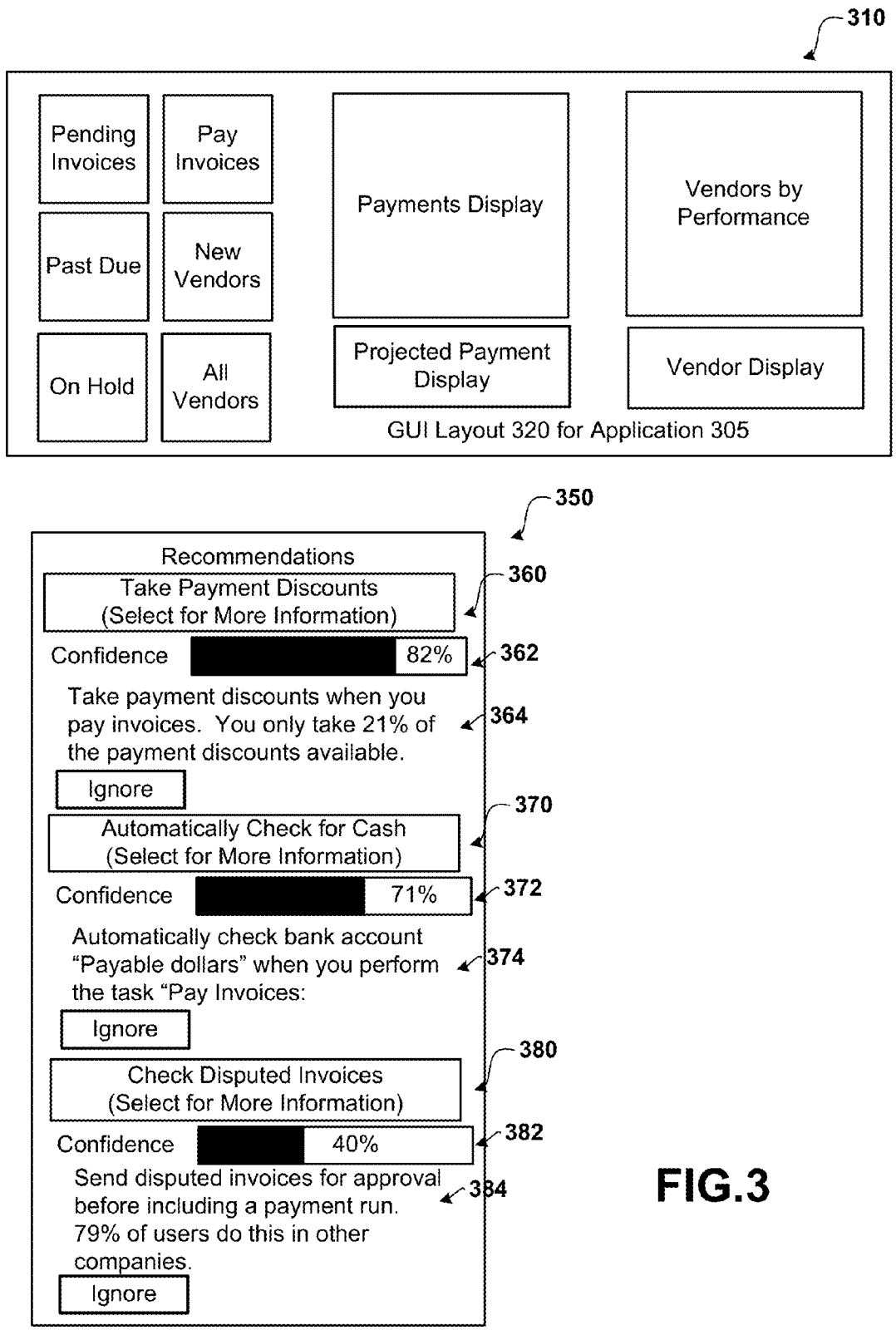
FIG. 3 shows automatically displaying recommendations and actions to change a display of the Graphical User Interface for an application based on contextual usage information.

FIG. 3 shows automatically displaying recommendations and actions to change a display of the Graphical User Interface for an application based on contextual usage information.

Display 310 shows an example GUI layout 320 that includes different user interface options used to interact with application 305. According to an embodiment, application 305 is an Enterprise Application Software (EAS) application or a Customer Relationship Management (CRM) software. As application 305 is interacted with by different users, contextual usage information is stored. In addition to storing contextual usage information for a user, contextual usage information is stored for a larger set of users. For example, contextual usage information may be collected and stored for each of the different users interacting with application 305. This larger set of contextual usage information may be used to automatically determine recommendations for a user. For example, it may be determined that a user in one business is not taking advantage of a certain feature in the application that is used by similarly situated companies.

Display 350 shows example recommendations that were automatically determined for a user of an application. According to an embodiment, the recommendations are automatically determined by comparing the usage patterns for the user against usage patterns determined from a larger set of contextual information. For example, functionality of application 305 that is not being used by the user but is being used by similarly situated users is identified. The recommendations are based on the scenarios related to the user.

As illustrated, recommendation display 350 shows three different recommendations, including a Take Payment Discounts 360 recommendation, an Automatically Check for Cash Recommendation 370 and a Check Disputed Invoices 380 recommendation. More or less recommendations may be presented depending on the contextual usage information.

Take Payment Discounts 360 is a selectable user interface option that when selected displays more information and actions that are associated with the recommendation (See FIG. 4 and related discussion). A confidence indicator 362 is displayed that indicates a confidence level of the recommendation being applicable and helpful to the user. The confidence level may be calculated using different methods. For example, the confidence level may be based on the difference between a use by other similar users as compared to the use of the user viewing the recommendation. A summary 364 is displayed that provides a brief summary of the recommendation. A user may also dismiss the recommendation (e.g. select the "Ignore" option).

Figure 5:
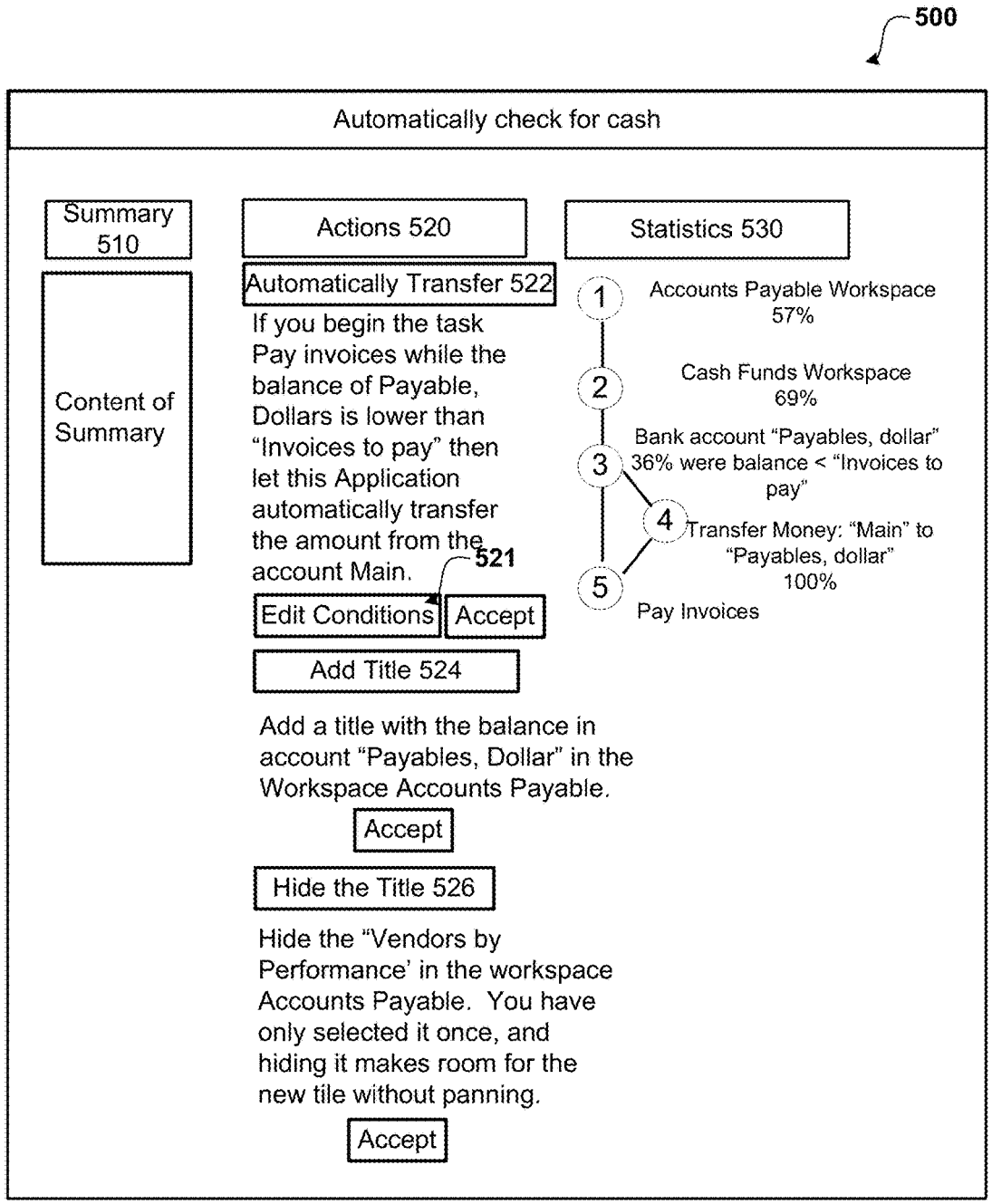
FIG. 5 shows an example recommendation and actions to change a display of the Graphical User Interface for an application.

Automatically Check for Cash Recommendation 370 is a selectable user interface option that when selected displays more information and actions that are associated with the recommendation (See FIG. 5 and related discussion). A confidence indicator 372 is displayed that indicates a confidence level of the recommendation being applicable and helpful to the user. A summary 374 is displayed that provides a brief summary of the recommendation. A user may also dismiss the recommendation (e.g. select the "Ignore" option).

Check Disputed Invoices 380 is a selectable user interface option that when selected displays more information and actions that are associated with the recommendation. A confidence indicator 382 is displayed that indicates a confidence level of the recommendation being applicable and helpful to the user. A summary 384 is displayed that provides a brief summary of the recommendation. A user may also dismiss the recommendation (e.g. select the "Ignore" option).

FIG. 4 shows an example recommendation and actions to change a display of the Graphical User Interface for an application.

As illustrated, recommendation 400 for the "Take Payment Discounts Recommendation" includes a summary section 410, actions section 420, rationale section 430, and statistics section 440.

The current example is a recommendation for a user interacting with an Enterprise Application Software (EAS) application. As contextual usage information is collected and aggregated for the user (or a small group of users), recommendations are automatically determined by comparing the aggregated contextual usage information to a larger set of aggregated contextual usage information. The user's contextual usage information is compared against contextual usage information obtained from other similar companies and users.

In the current example, summary section 410 displays a summary to the user that indicates that the comparison determined that the user only takes advantage of payment discounts 21% of the time whereas other similar companies take advantage of payment discounts 75% of the time.

Actions section 420 displays one or more actions that may be accepted by the user to change the display of the GUI. In the current example, a recommendation to show a column in the GUI is presented to the user. If the recommended action is selected by the user (e.g. selecting the accept option), the display of the GUI is updated to reflect the action and the column is shown.

Rationale section 430 shows a rationale for accepting the recommended action. The rationales that are displayed within the recommendation may be predefined and associated with one or more user interface options.

Statistics section 440 shows statistics relating to current statistics related to the action for the user and for the cross-company comparison. Different statistics may be displayed. In the current example, a graph 442 (e.g. a line graph, a bar graph, a pie chart, . . . ) is displayed that shows how the user currently takes advantage of payment discounts. A graph 444 is also displayed that shows the user how their usage of taking payment discounts compares across their industry.

FIG. 5 shows an example recommendation and actions to change a display of the Graphical User Interface for an application.

Summary section 510 displays a summary to the user on why the recommendation is displayed to the user. According to an embodiment, the summary displays information relating to the comparison of the user's use of the application functionality related to the recommendation as compared to the usage determined from a larger set of users.

Actions section 520 displays actions that may be accepted by the user to change the display of the GUI. In the current example, an automatic transfer action 522, an add title action 524 and a hide the title action 526 is presented to the user. If the recommended action is selected by the user (e.g. selecting the accept option), the display of the GUI is updated to reflect the action.

In the current example, an edit conditions 521 option is shown that allows a user to adjust the conditions on when or how the action is applied. In the current example, the user may edit the transfer conditions.

Statistics section 530 shows a rationale for accepting the recommended action. The rationales that are displayed within the recommendation may be predefined and associated with one or more user interface options.

Figure 6:
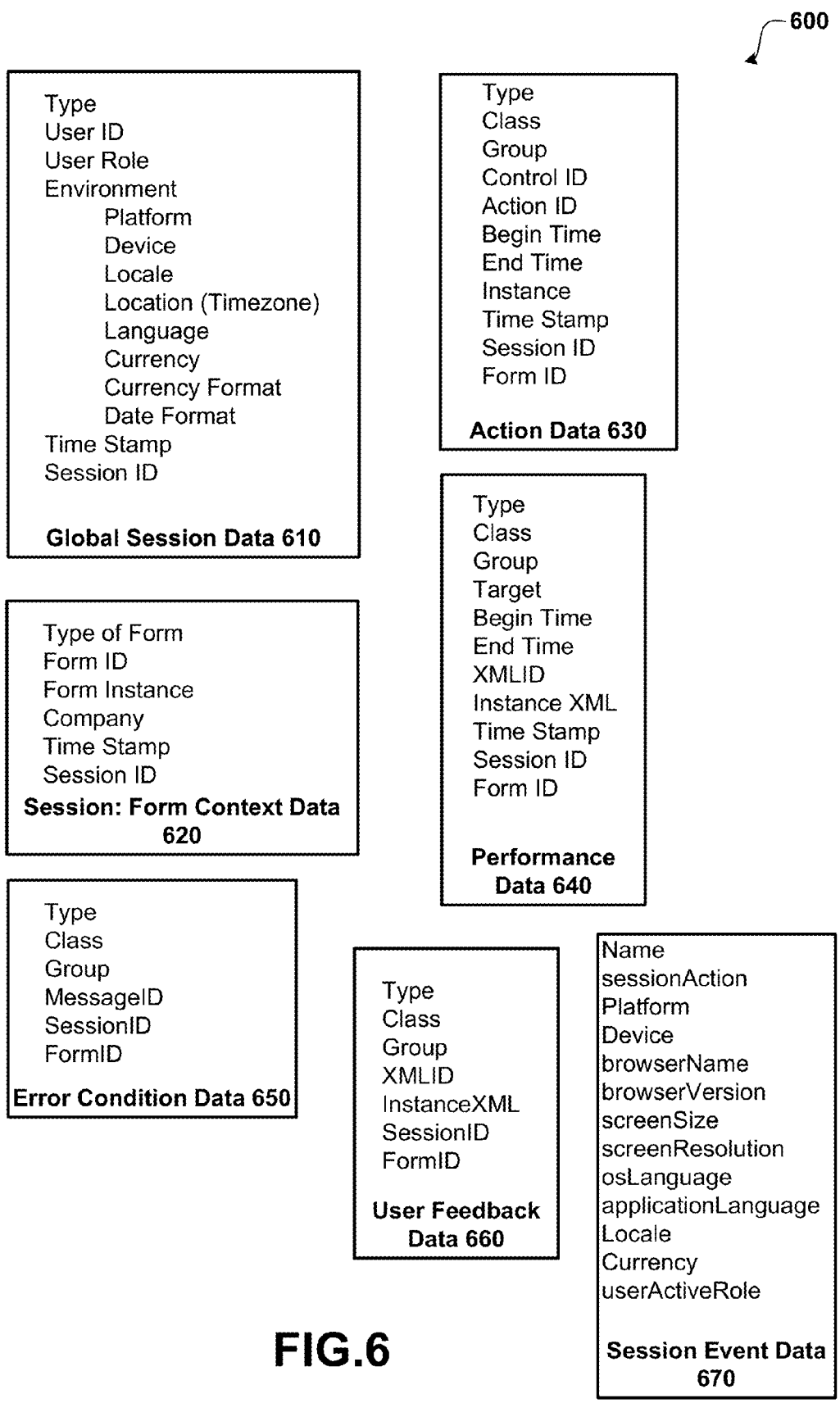
FIG. 6 illustrates exemplary contextual usage information that may be collected and used to automatically change the display of the Graphical User Interface.

FIG. 6 illustrates exemplary contextual usage information that may be collected and used to automatically change the display of the Graphical User Interface.

As illustrated, contextual information that is collected includes global session data 610, form context data 620, action data 630, performance data 640, error condition data 650, and user feedback data 660. More or less data may be collected. Preferences may be set by the user to determine what data to collect and use.

A user session where contextual information is collected begins with creating a global session data 610 package. Session data 610 package contains the global context information that in most instances exists for the life of the session. According to an embodiment, the global session data includes values for: Type; User ID; User Role; Environment values (e.g. Platform, Device, Locale, Location (Time zone), Language, Currency, Currency Format, Date Format, Time Stamp and Session ID), a time stamp of when the session stars and a unique session ID for the session.

According to an embodiment, a new session is started when one of session values in the global session data 610 changes. For example, a new session data is created when the currency value changes or the platform changes.

When a new form is opened in the user interface, a form context data 620 package is created. A new form may be a form within the user interface, a page within the interface, and the like. According to an embodiment, the form context data 620 includes values for the Type of Form, a Form ID, a Form Instance, a Company value, a Time Stamp value and the associated session ID. When a value in the any Form Context data 620 changes, a new Form Context 620 package is created.

Each action with the user interface is recorded in action data 630. According to an embodiment, the action data includes values for type, class, group, Control ID, Action ID, a begin time, an end time, an Instance value, a time stamp value, a session ID, and a form ID associated with the form being interacted with. Each time an Action event is recorded, the session ID and Form ID value are included which ties the action to the corresponding Form Context data.

Performance data 640 includes data relating to the performance of an action. According to an embodiment, the performance data 640 includes values for type, class, group, target, a begin time, an end time, an XMLID, an Instance XML value, a time stamp value, a session ID, and a form ID associated with the form being interacted with. Each time a Performance data 640 is recorded, the session ID value and Form ID are value included, which ties the performance to the corresponding form context 620. Performance data 640 also includes a target value that identifies the element being recorded (e.g. a pre-defined enumeration such as: Serializer, Metadata Load, DBQuery, and the like).

Error condition data 650 records any errors that occur during the interaction. According to an embodiment, the error condition data 650 includes a type value, a class value, a group value, a message ID value, a session ID value, and a form ID value. Each time an error condition is recorded, the session ID and Form ID are included which ties the error to the corresponding form context.

User feedback data 660 is recorded when any user feedback is received. For example, a user may select an option within the application to leave feedback. According to an embodiment, the user feedback data 660 includes a type value, a class value, a group value, an XMLID value, an Instance XML value, a session ID value, and a form ID value. Each time user feedback data is recorded, the session ID and Form ID are included which ties the feedback to the corresponding form context.

Session event data 670 shows more specific information relating to settings for interacting with the application. According to an embodiment, the session event data 670 includes a name, a session action, a platform, a device, a browser name, a browser version, a screen size, a screen resolution, an operating system language, an application language, a locale value, a currency value, and a role of the user is included.

Any portion of the recorded information may be used in automatically changing the display of the user interface. For example, the user interface may change based on the language being used, the device being used, a screen size, and the like.

Figure 7:
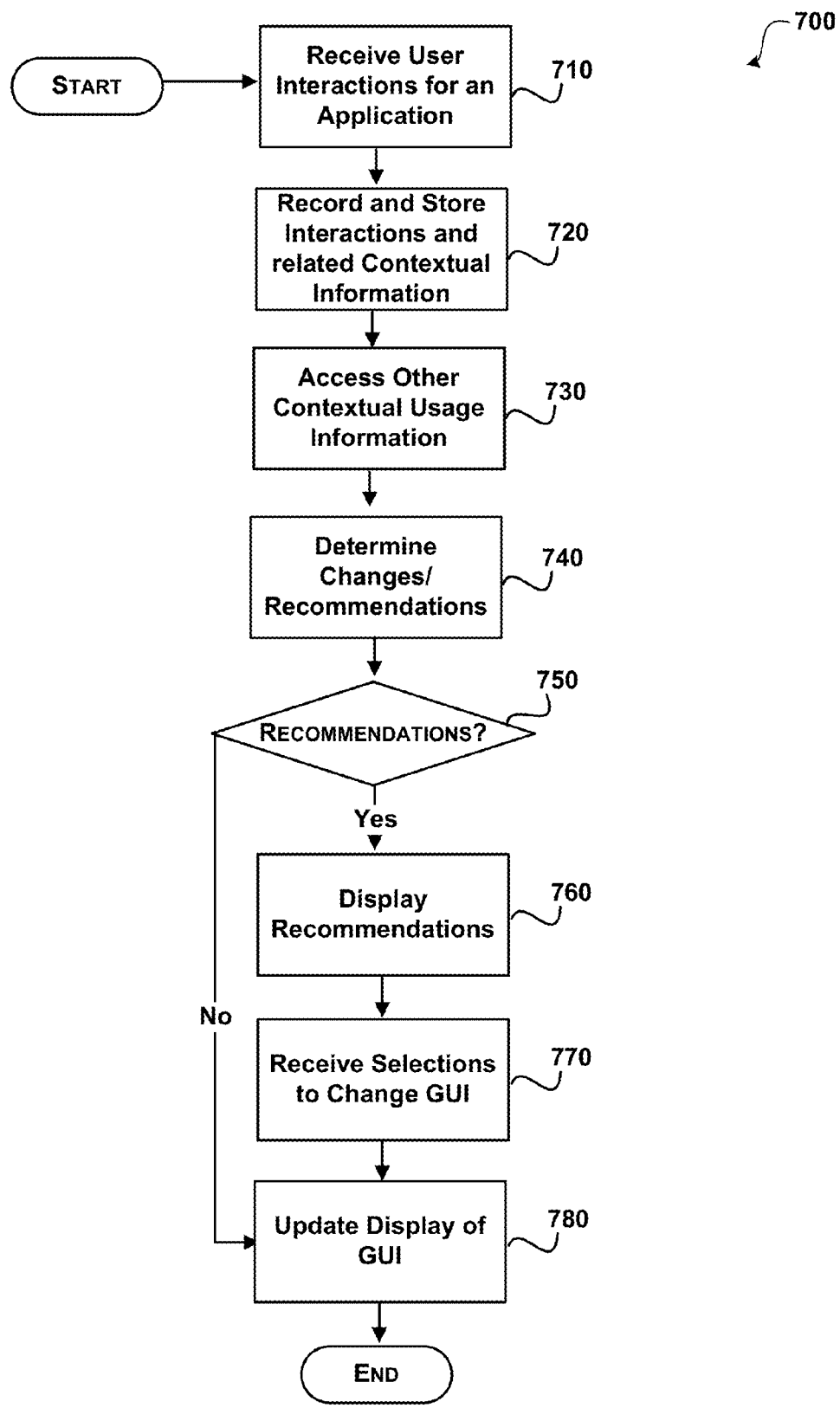
FIG. 7 illustrates a process for automatically providing recommendations and changing a display of a Graphical User Interface for an application.

FIG. 7 illustrates a process for automatically providing recommendations and changing a display of a Graphical User Interface for an application. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

After a start operation, the process moves to operation 710, where user interactions are received for an application. The user interactions may include a variety of different interactions, such as selections of a GUI element, interaction with a GUI element, and the like. According to an embodiment, the user interactions relate to interactions with the GUI of the application. For example, selecting a menu, changing a view, and the like.

Flowing to operation 720, the interactions and related contextual information is stored. As discussed herein, the user may set preferences to determine what contextual information is collected, stored and used. The contextual information is a rich set of contextual information that describes the current scenario that involves the user interaction. The contextual usage information that is recorded includes not only the action but contextual information including, but not limited to: environment values, an identity, a role of the user, a location of the user, system configuration data, application configuration data, error information, performance information, time information, and the like. The contextual data is linked to the associated action that is received. According to an embodiment, an Application Programmer Interface (API) may be used to add additional specific identity or context to the recorded action. This information may be added at runtime of the application. For example, the API may be used to include specific business context to the application being used (e.g. identify a number of checks to be selected, a number of transactions to be posted, . . . ). According to an embodiment, contextual information is stored for the user and also for other users interacting with the application. The contextual usage information for one or more of the users may be aggregated with other users.

Moving to operation 730, contextual usage information for a group of similarly situated users (e.g. same industry, same job description, same role, . . . ) is accessed.

Transitioning to operation 740, the changes and recommendations are determined. The aggregated contextual usage information that is associated with the user is automatically analyzed to determine the user's common usage patterns. The display of the GUI can be adjusted to make the common actions more prominent or accessible to the user. For example, the layout of the GUI may be changed to reflect commonly used elements.

The aggregated contextual usage information that is associated with the user is compared to a larger set of contextual usage information that is associated with more users. For example, the user's common usage patterns may be compared to a larger group of similar users to determine recommendations to present to the user. The recommendations may be automatically determined by comparing the common usage patterns against the larger group's usage patterns to determine what functionality of the application is not being used by the user that is being used by other users. The recommendations are based on the scenarios related to the user.

Flowing to decision operation 750, a determination is made as to whether any recommendations have been determined. When there are not any recommendations to display, the process flows to operation 780. When there are recommendations, the process flows to operation 760.

Transitioning to operation 760, the recommendations are displayed. The recommendations may be displayed using different methods. For example, the recommendations may be displayed when a recommendation GUI element is selected and/or automatically. According to an embodiment, a displayed recommendation includes a confidence of the recommendation, a summary of the recommendation, an ignore recommendation option and a view more information action. Selection of the view more information action displays more detailed information relating to the recommendation. For example, the more detailed recommendation may include a summary of the recommendation, action(s) that if selected affect the display of the GUI, a rationale for providing the recommendation, and a display of statistical information relating to the recommendation.

Flowing to operation 770, selections to change the display of the GUI are received. According to an embodiment, an accept option is displayed next to each recommendation to change the display of the GUI. Any of the proposed actions that are accepted by the user are reflected when the display of the GUI is updated.

Moving to operation 780, the display of the GUI is updated.

The process flows to an end operation and returns to processing other actions.

Figure 8:
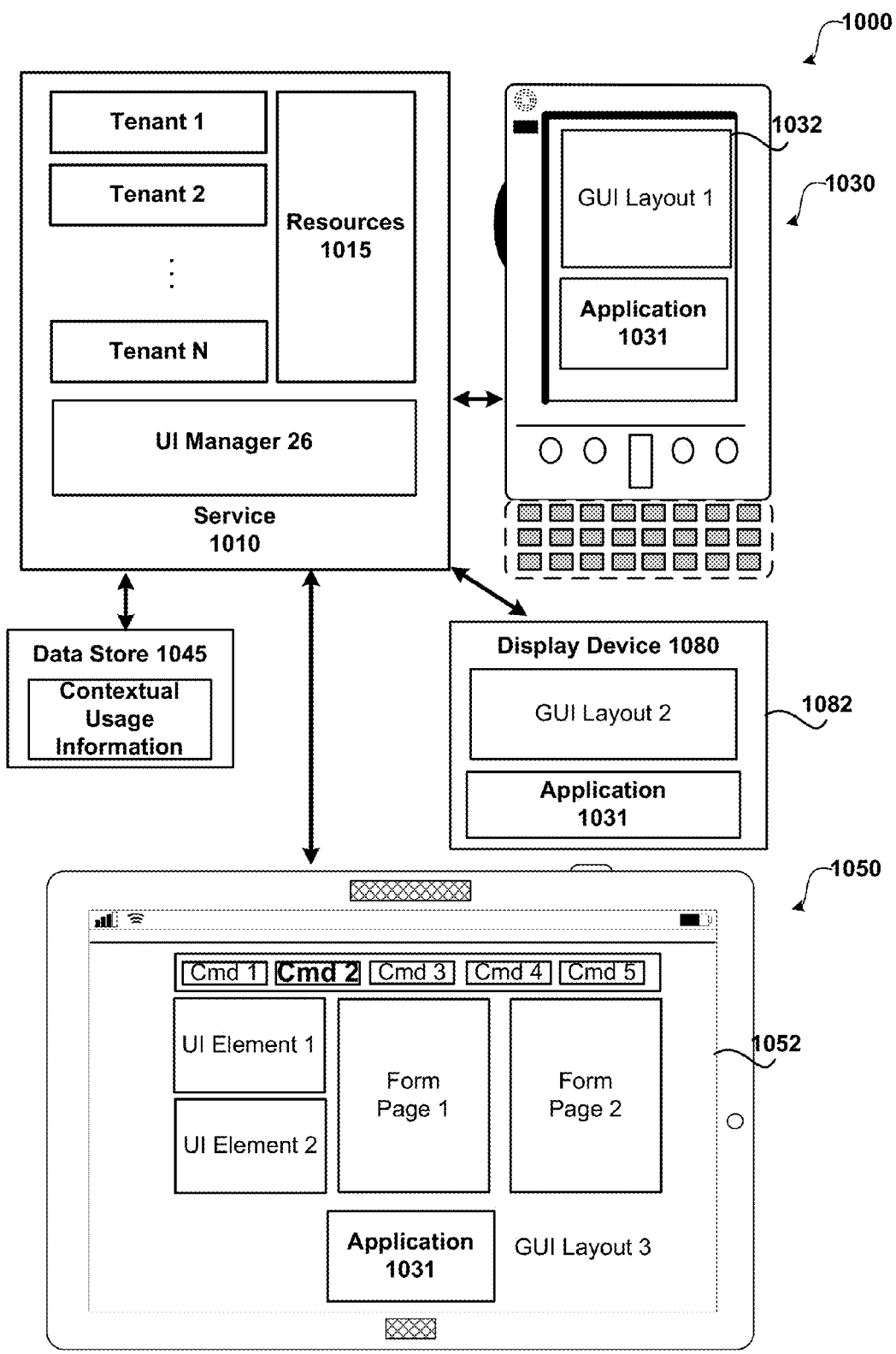
FIG. 8 illustrates an exemplary online system for using contextual usage information to change a display of a Graphical User Interface of an application.

FIG. 8 illustrates an exemplary online system for using contextual usage information to change a display of a Graphical User Interface of an application. As illustrated, system 1000 includes service 1010, data store 1045, touch screen input device 1050 (e.g. a slate), smart phone 1030 and display device 1080.

As illustrated, service 1010 is a cloud based and/or enterprise based service that may be configured to provide services, such as productivity services (e.g. CRM, EAS, spreadsheet, messaging, presentation, and the like). Service 1010 may also provide other services. The service may be interacted with using different types of input/output. For example, a user may use speech input, touch input, hardware based input, and the like. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with application 1031.

As illustrated, touch screen input device 1050, smart phone 1030, and display device 1080 shows exemplary displays 1052/1032/1082 showing the use of application 1031. Data may be stored on a device (e.g. smart phone 1030, slate 1050 and/or at some other location (e.g. network data store 1045). Data store 1045, or some other store, may be used to store contextual usage information as well as other data. The applications used by the devices may be client based applications, server based applications, cloud based applications and/or some combination. According to an embodiment, display device 1080 is a device such as a MICROSOFT XBOX coupled to a display.

UI manager 26 is configured to perform operations relating to automatically changing the display of a GUI for an application as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
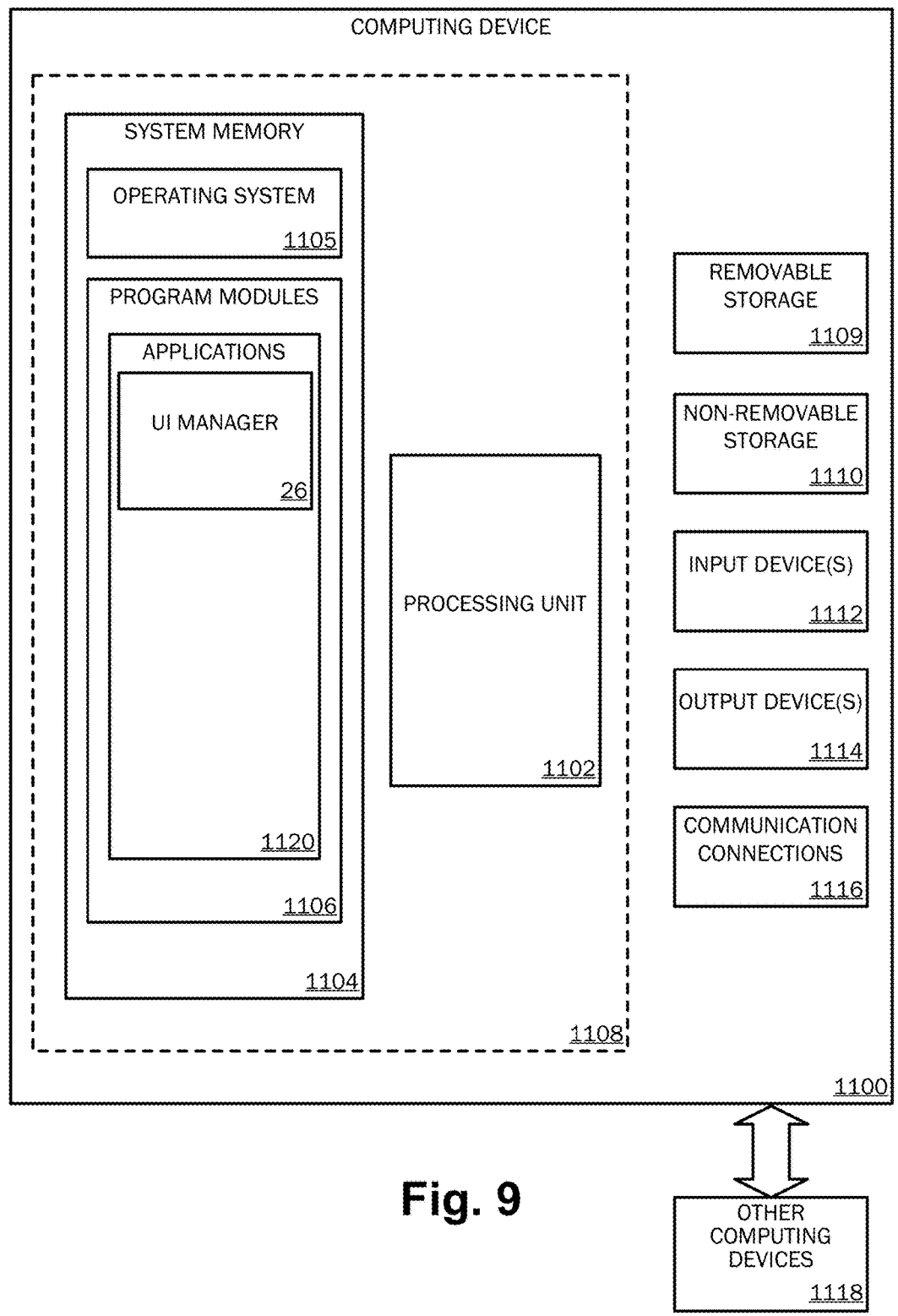
FIGS. 9, 10A, 10B and 11 and the associated descriptions provide a discussion of a variety of operating environments in which embodiments of the invention may be practiced.
Figure 10A:
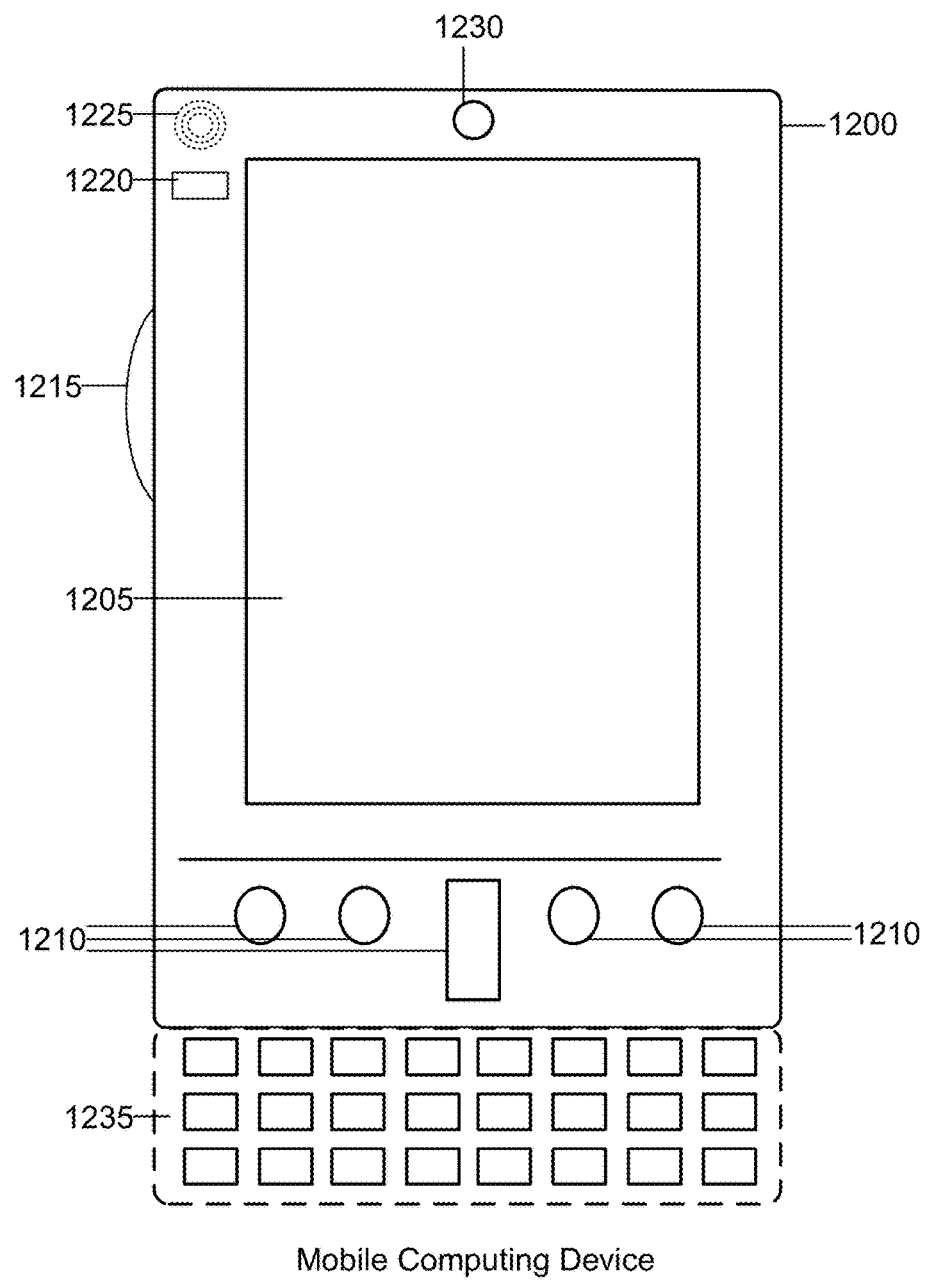
Figure 10B:
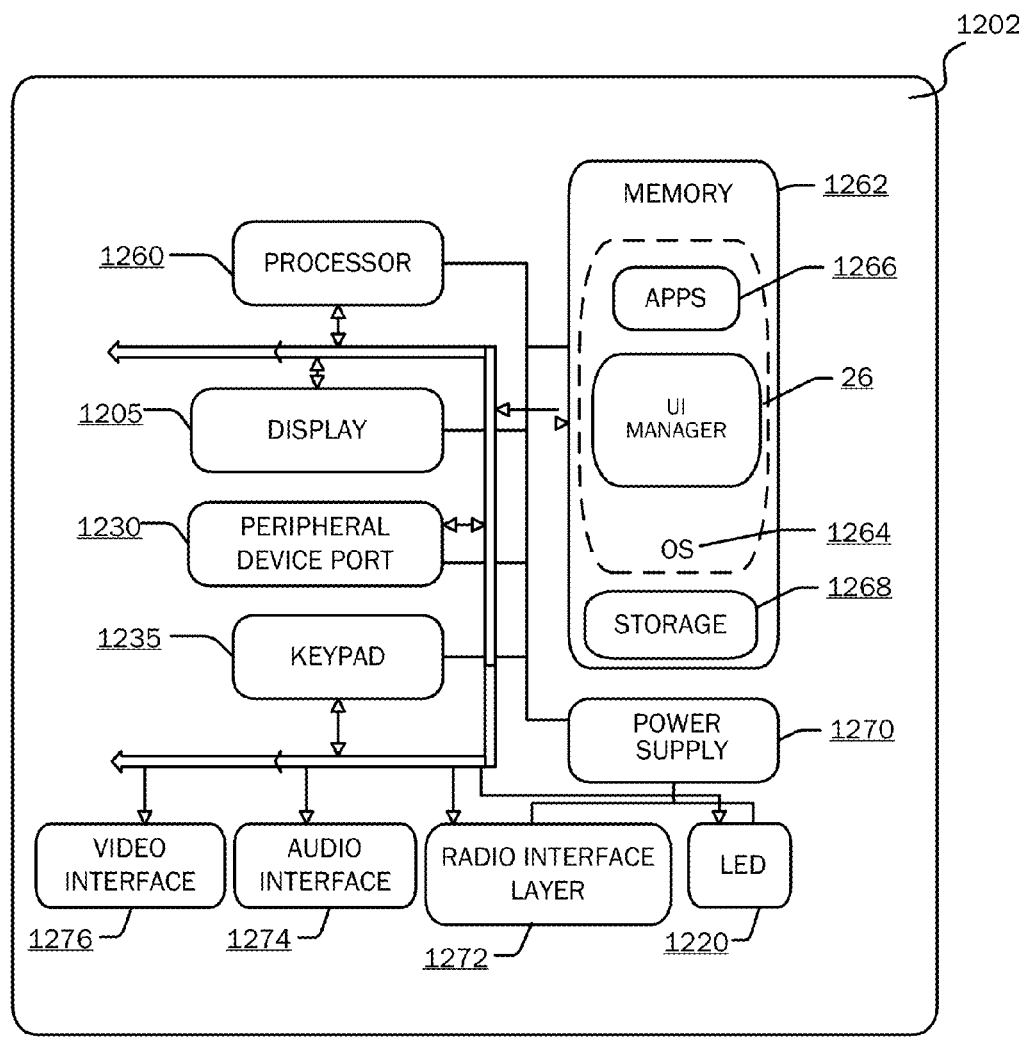
Figure 11:
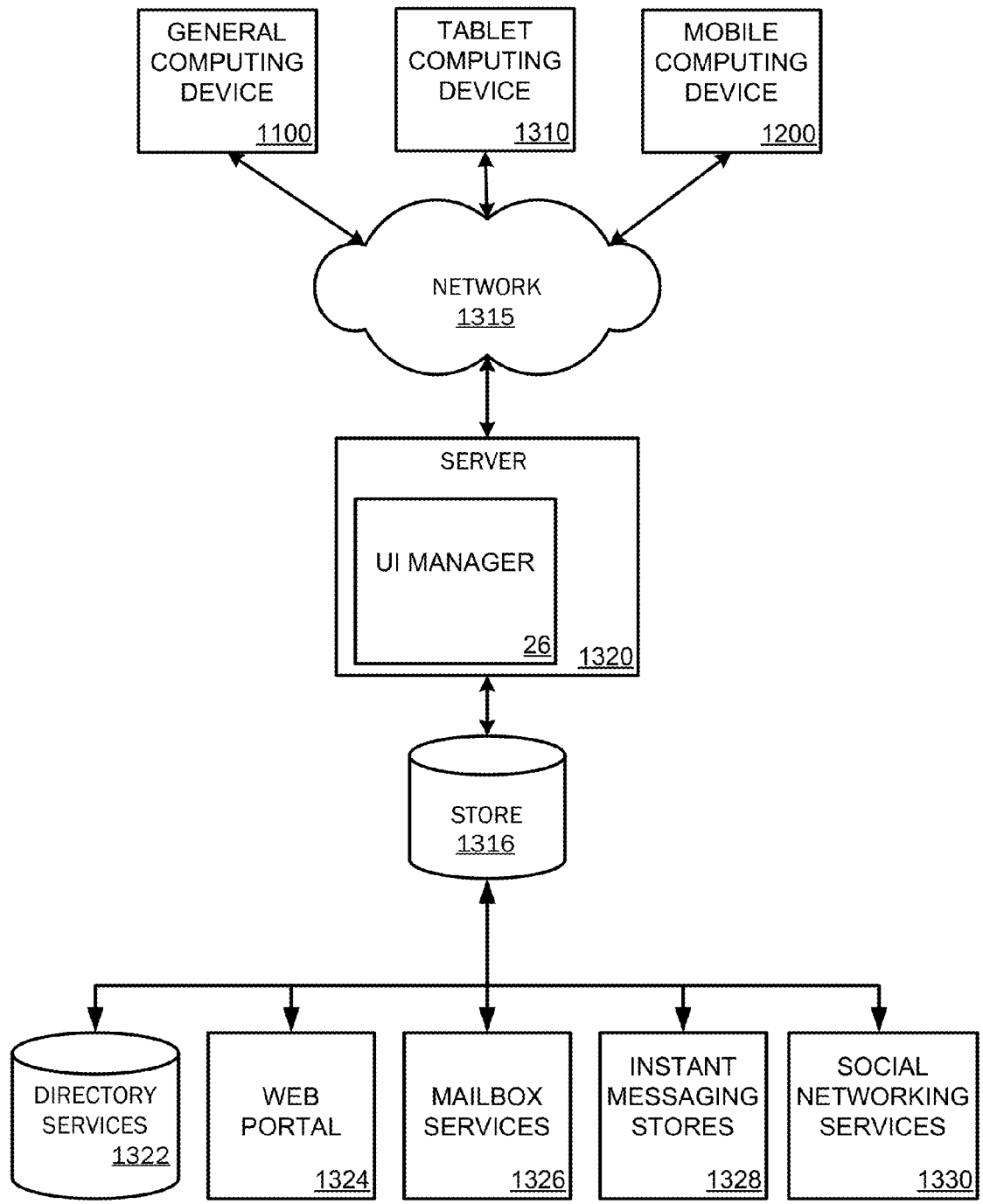

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the UI manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 9 by a removable storage device 1109 and a non-removable storage device 1110.

As stated above, a number of program modules and data files may be stored in the system memory 1104. While executing on the processing unit 1102, the program modules 1106 (e.g., the UI manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the UI manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the UI manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like. System 1202 may also include a peripheral device port 1230.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of a system for changing the display of a Graphical User Interface, as described above. Content developed, interacted with, or edited in association with the UI manager 26 may be stored in different communication channels or other storage types. For example, various documents may be stored using a directory service 1322, a web portal 1324, a mailbox service 1326, an instant messaging store 1328, or a social networking site 1330. The UI manager 26 may use any of these types of systems or the like for enabling data utilization, as described herein. A server 1320 may provide the UI manager 26 to clients. As one example, the server 1320 may be a web server providing the UI manager 26 over the web. The server 1320 may provide the UI manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for changing a display of a Graphical User Interface (GUI), comprising:
    sending instructions to display the GUI for an application having GUI elements;
    receiving user interactions through the GUI from a user;
    storing contextual usage information comprising the user interactions and contextual information that is associated with the user interactions;
    determining changes to the display of the GUI by comparing the contextual usage information of the user with other contextual usage information from a group of other users to determine what functionality is not being used by the user;
    sending instructions to display a recommendation for changing the display wherein the recommendation is determined by the comparison;
    receiving an input indicating acceptance of the recommendation to change the display of the GUI; and
    in response to receiving the input indicating acceptance of the recommendation, changing a layout of the GUI elements being displayed for the application to reflect the determined changes.

2. The method of claim 1, wherein changing the layout of the GUI elements being displayed for the application to reflect the determined changes comprises displaying an action with the recommendation that when selected changes the display of the GUI.

3. The method of claim 1, wherein storing the contextual usage information comprising the user interactions and the contextual information that is associated with the user interaction comprises storing the contextual usage information that is associated with a single user.

4. The method of claim 1, wherein the contextual information comprises environmental information that defines a current environment in which each of the received interactions occur including at least one of a computing device type, a time of each of the user interactions, and forms in the GUI that are associated with each of the user interactions.

5. The method of claim 1, wherein changing the layout of the GUI elements being displayed for the application comprises changing a display of an element that is displayed on the GUI.

6. The method of claim 1, further comprising sending instructions to display a confidence indicator with the recommendation.

7. The method of claim 1, further comprising sending instructions to display comparative statistical information with the display of the recommendation.

8. The method of claim 1, wherein the layout is changed as a result of the GUI elements being moved relative to one another.

9. The method of claim 1, wherein the layout is changed as a result of creating a new GUI element.

10. The method of claim 1, wherein the layout is changed as a result of removing one of the GUI elements.

11. A computer-readable storage device storing computer-executable instructions for changing a display of a Graphical User Interface (GUI), comprising:
    receiving instructions to display the GUI for an application having GUI elements;
    accessing stored contextual usage information for a user comprising received interactions and contextual information that is associated with the user interactions;
    automatically determining changes to the display of the GUI by comparing the contextual usage information of the user with other contextual usage information from a group of other users to determine what functionality is not being used by the user;
    sending instructions to display a recommendation for changing the display wherein the recommendation is determined by the comparison;
    receiving an input indicating acceptance of the recommendation to change the display of the GUI; and
    in response to receiving the input indicating acceptance of the recommendation, changing a layout of the GUI elements being displayed for the application to reflect the determined changes.

12. The computer-readable storage device of claim 11, wherein changing the layout of the GUI elements being displayed for the application to reflect the determined changes comprises displaying a confidence indicator with the recommendation and displaying an action with the recommendation that when selected changes the display of the GUI to reflect the recommendation.

13. The computer-readable storage device of claim 11, further comprising storing each received interaction and associated contextual information during a session with the application.

14. The computer-readable storage device of claim 11, wherein the contextual information comprises environmental information that defines a current environment in which each of the received interactions occur including a computing device type, a time of each of the user interactions, and forms in the GUI that are associated with each of the user interactions.

15. The computer-readable storage device of claim 11, wherein changing the layout of the GUI elements being displayed for the application to reflect the determined changes comprises at least one of: removing at least one of the GUI elements or adding another GUI element.

16. The computer-readable storage device of claim 11, wherein changing the layout of the GUI elements being displayed for the application to reflect the determined changes comprises changing a display of an element that is displayed on the GUI.

17. A system for changing a display of a Graphical User Interface (GUI), comprising:
    a processor and memory;
    an operating environment executing using the processor; and
    a UI manager that is configured to perform actions comprising:
        receiving instructions to display the GUI for an application having GUI elements;
        accessing stored contextual usage information for a user comprising received interactions and accessing other contextual information that is associated with the user interactions;

automatically determining a change to the display of the GUI by comparing the contextual usage information of the user with other contextual usage information from a group of other users to determine what functionality is not being used by the user;

automatically determining when to display a recommendation that includes a selectable action that when selected, causes the change to the display of the GUI, wherein the recommendation is determined by the comparison;

automatically determining when to implement the change to the display of the GUI;

sending instructions for displaying the recommendation;

receiving an input indicating acceptance of the recommendation; and in response to receiving the input indicating acceptance of the recommendation, changing a layout of the GUI elements being displayed for the application to reflect the change.

18. The system of claim 17, wherein changing the layout of the GUI elements being displayed for the application to reflect the change comprises at least one of: removing at least one of the GUI elements or adding another GUI element.

19. The system of claim 17, wherein changing the layout of the GUI elements being displayed for the application to reflect the change comprises changing a display of an element that is displayed on the GUI.

* * * * *